(12) United States Patent
Liu

(10) Patent No.: US 7,775,954 B2
(45) Date of Patent: Aug. 17, 2010

(54) CUTTER SHIFTING MECHANISM FOR CENTER MACHINE

(76) Inventor: Yi-Chun Liu, 6F-3, No. 31, Sec. 3, Dongsing Rd., West District, Taichung City 403 (TW)

( * ) Notice: Subject to any disclaimer, the term of this patent is extended or adjusted under 35 U.S.C. 154(b) by 722 days.

(21) Appl. No.: 11/767,599

(22) Filed: Jun. 25, 2007

(65) Prior Publication Data

US 2008/0317560 A1   Dec. 25, 2008

(51) Int. Cl.
*B23Q 3/157* (2006.01)

(52) U.S. Cl. ............................. 483/39; 483/44; 414/736

(58) Field of Classification Search ............ 483/38–39, 483/44, 902, 40–41, 48, 56, 66–67; 414/736; 74/29–30
See application file for complete search history.

(56) References Cited

U.S. PATENT DOCUMENTS 3,760,958 A * 9/1973 Lohneis ...................... 414/736
3,786,938 A * 1/1974 Kirkham ...................... 414/736
5,947,879 A * 9/1999 Sun ............................... 483/44
7,070,549 B1 * 7/2006 Sun ................................ 483/7
7,070,550 B1 * 7/2006 Sun ............................. 483/39

FOREIGN PATENT DOCUMENTS

JP    57-211443 A  * 12/1982
SU      867601 B  *  9/1981

* cited by examiner

*Primary Examiner*—Erica E Cadugan
(74) *Attorney, Agent, or Firm*—Banger Shia

(57) ABSTRACT

A cutter shifting mechanism includes a main body having a longitudinal cylinder casing and a shaft is located in the longitudinal cylinder casing. An arm is connected to a lower end of the shaft so as to be connected with cutters. A longitudinal pushing device is connected to a top end of the shaft and a gear is rotatably mounted to the shaft. The gear is movable along a longitudinal axis of the shaft. A threaded rod is engaged with the gear and connected with a latitude pushing device. Each of the longitudinal and latitude pushing devices includes a pneumatic cylinder. The mechanism includes simple structure and can be manufactured at low cost. The pneumatic cylinders accurately operate the parts of the mechanism.

9 Claims, 3 Drawing Sheets

CUTTER SHIFTING MECHANISM FOR CENTER MACHINE

BACKGROUND OF THE INVENTION (1) Field of the Invention

The present invention relates to a cutter shifting mechanism for center machine and includes longitude and altitude cylinders to change the cutter on the shaft with the cutters in the cutter storage unit.

(2) Description of the Prior Art

A conventional center machine includes a cutter storage unit which basically is a disk with which a plurality of cutters are engaged. The disk is driven by a motor so that a pick-up mechanism is able to pick the cutter at a certain position. If the number of the cutters is significant and cutter storage unit occupies a huge space and a powerful motor is needed to drive the disk. If any one of the cutters is damaged or stocked, the whole cutter storage unit has to stop and this might slow down the procedures of machining to objects.

The present invention intends to provide a cutter shifting mechanism for center machine and is able to shift the cutter on the shaft with the cutters in cutter storage unit.

SUMMARY OF THE INVENTION

The present invention relates to a cutter shifting mechanism which comprises a main body having a longitudinal cylinder casing and a shaft is located in the longitudinal cylinder casing. An arm is connected to a lower end of the shaft. A longitudinal pushing device is connected to a top end of the shaft and a gear is rotatably mounted to the shaft and movable along a longitudinal axis of the shaft. A threaded rod is engaged with the gear and connected with a latitude pushing device. Each of the longitudinal and latitude pushing devices includes a pneumatic cylinder.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
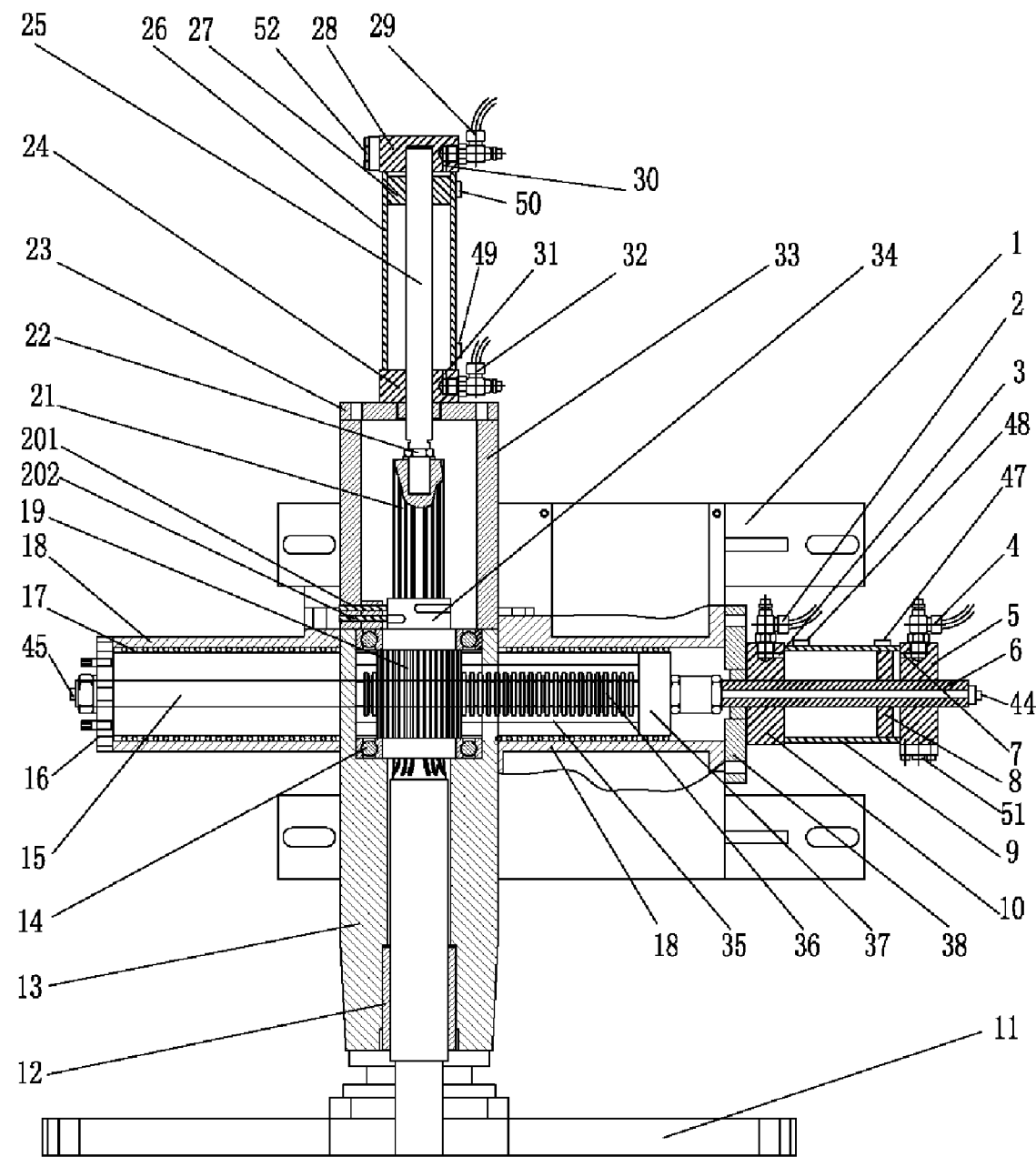
FIG. 1 is a front cross sectional view of the cutter shifting mechanism of the present invention.
Figure 2:
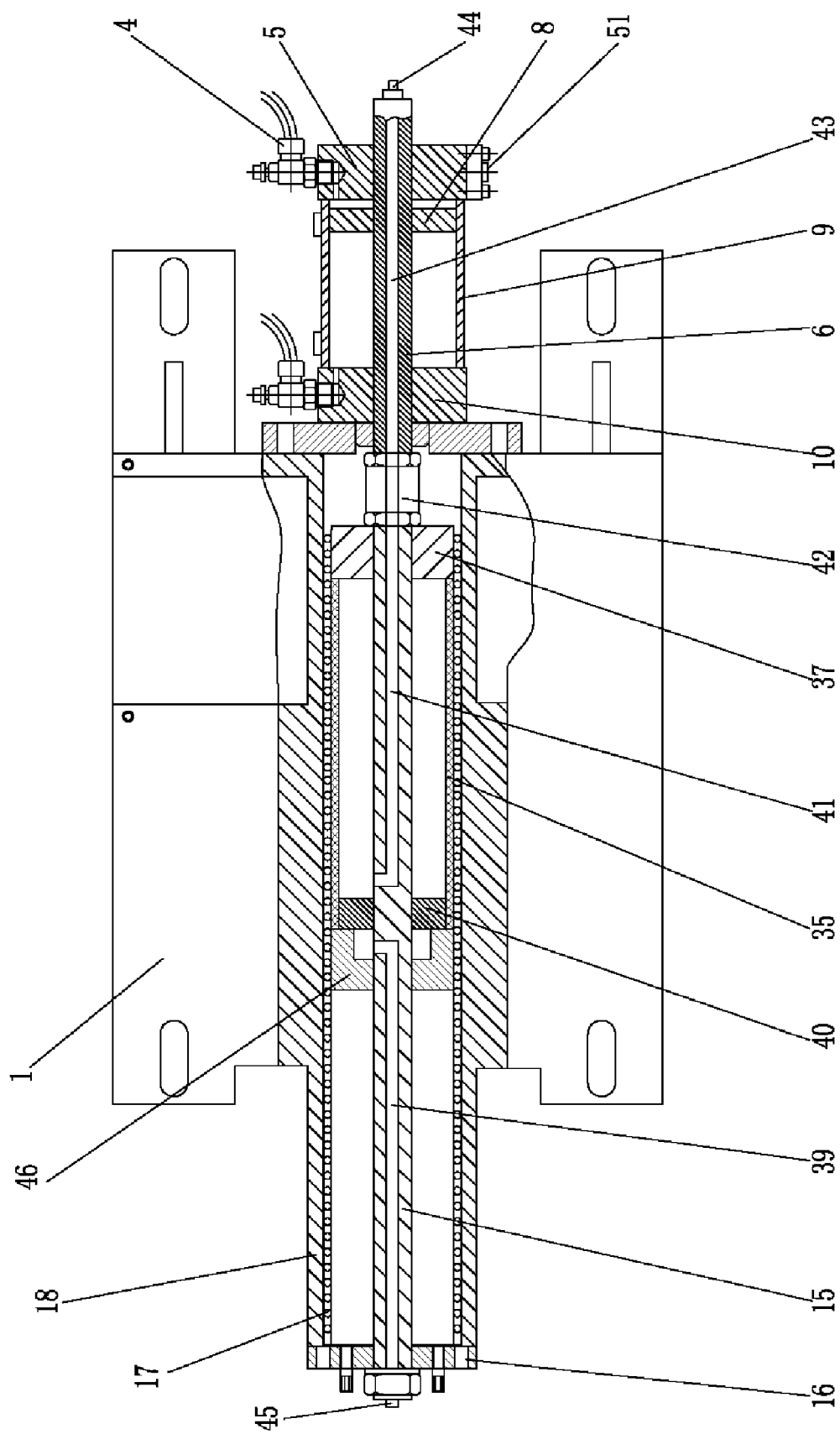
FIG. 2 is a side cross sectional view of the cutter shifting mechanism of the present invention.
Figure 3:
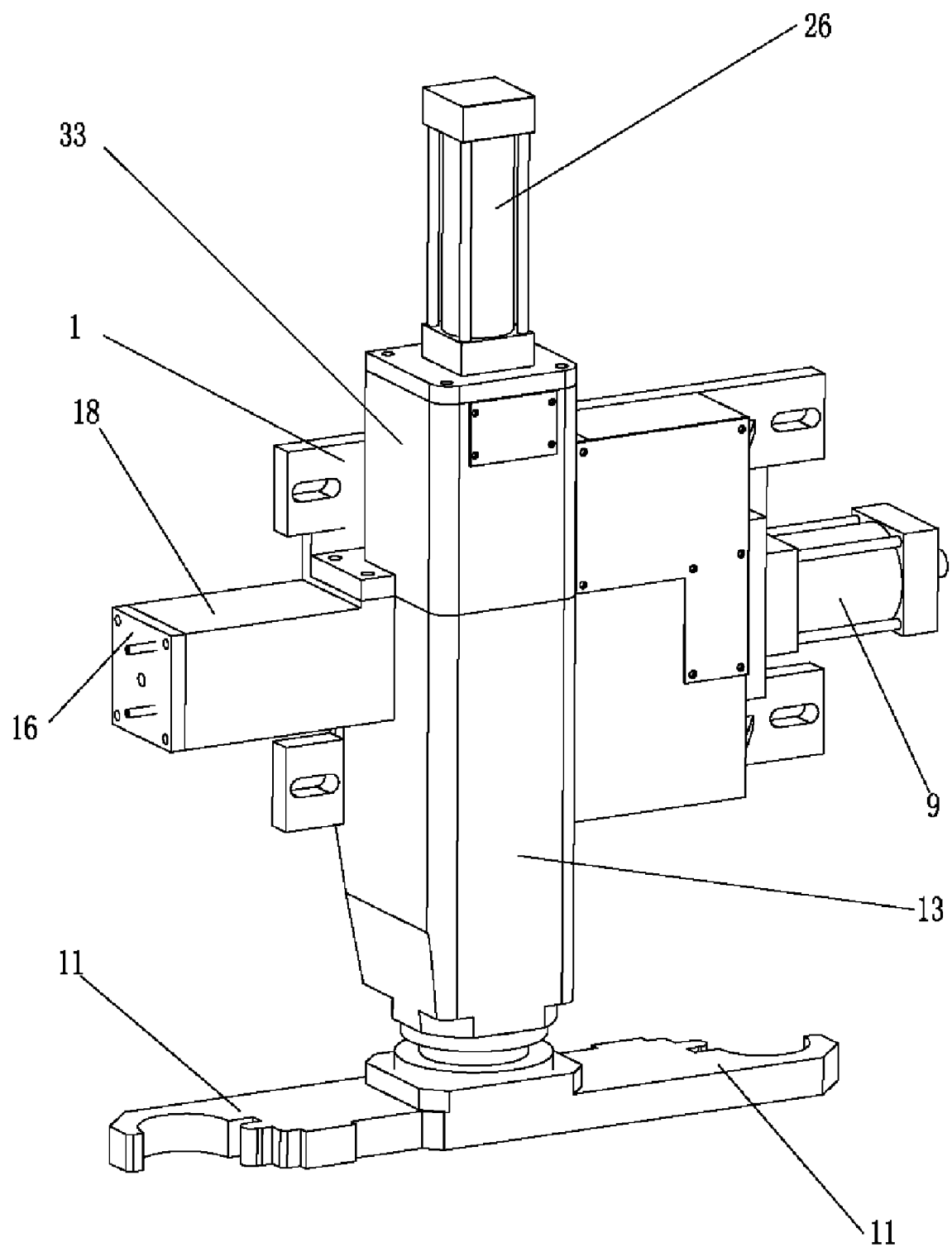
FIG. 3 is a perspective view to show the center machine with the cutter shifting mechanism of the present invention.

Referring to FIGS. 1 to 3, the cutter shifting mechanism of the present invention of the present invention comprises a main body 1 which includes a longitudinal cylinder casing and a shaft 21 is located in the longitudinal cylinder casing. An arm 11 is connected to a lower end of the shaft 21 and includes two symmetric ends for being connected with cutters (not shown). A longitudinal pushing device is connected to a top end of the shaft 21 and a gear 19 is rotatably mounted to the shaft 21. The gear 19 can be movable along a longitudinal axis of the shaft 21. The gear 19 and the shaft 21 are slidably connected to each other by way of engagement of keys and keyways. A threaded rod 36 is engaged with the gear 19 and connected with a latitude pushing device. Each of the longitudinal and latitude pushing devices includes a pneumatic cylinder so as to quickly and precisely move related parts. A main casing is fixed on the main body 1. The shaft 21 is located in the main casing which is composed of a lower casing 13 and an upper casing 33 which is connected to the lower casing 13. A slidable lubrication bearing 12 is mounted to the shaft 21 and located close to the lower end of the shaft 21.

The lower casing 13 and the main body 1 can be made to be a one-piece structure or to be two individual pieces. The pneumatic cylinder of the longitudinal pushing device is the longitudinal cylinder 26 which includes a bottom cap 24 and a top cap 28 respectively connected to two ends of the longitudinal cylinder 26. A piston rod 25 is received in the longitudinal cylinder 26 and extends through the bottom cap 24 and connected with the top end of the shaft 21 by bolts and nuts 22. The bottom cap 24 is fixed to the top cap 23 of the shaft by bolts and the top cap 23 is fixed to the top of the upper casing 33. The piston 27 in the longitudinal cylinder 26 is connected to the piston rod 25. The bottom cap 24 includes a connection member 32 which is in communication with the inner space of the longitudinal cylinder 26 via the path 31. The top cap 28 includes a connection member 29 which is in communication with the inner space of the longitudinal cylinder 26 via the path 30. The shaft 21 includes the keyways defined in an outer periphery thereof and the gear 19 includes keys which are slidably engaged with the keyways. The gear 19 is connected to the lower casing 13 and a bearing 14 is located therebetween. The threaded rod 36 is engaged with the gear 19 and connected with the latitude pushing device. The altitude pushing device includes a latitude cylinder casing 18 which includes a latitude cylinder received therein. The latitude cylinder casing 18 includes a latitude cylinder received therein which includes an inner cylinder 35 with a right cap 37 and a left cap 46 connected on two ends of the inner cylinder 35. A linear bearing 17 is located in the latitude cylinder casing 18 so that the latitude cylinder is moved relative to the latitude cylinder casing 18.

The threaded rod 36 is located in an inner cylinder 35 in the latitude cylinder and a piston rod 15 is received in the latitude cylinder. A first end of the piston rod 15 extends through the inner cylinder 35 and an end cap 16 of the latitude cylinder casing 18. The end cap 16 is fixed to the latitude cylinder casing 18 by bolts. A second end of the piston rod 15 extends through the inner cylinder 35 and is connected to an end of a piston rod 6 of the latitude cylinder by a locking nut 42. The latitude cylinder is composed of a cylinder 9 and a right cap 5 and a left cap 10 are respectively connected to two ends of the cylinder 9 by bolts. The piston 8 is connected to the piston rod 6 and the latitudinal cylinder is fixed to the main body 1 by bolts.

The two piston rods 15 and 6 of the latitude cylinder are hollow and tubular rods, the piston rod 15 includes a path 39 in the left part thereof and a path 41 in the right part thereof. The piston rod 6 includes a path 43 defined therein. The path 39 has one end communicating with an inlet/outlet port 45 at the end cap 16 and the other end of the path 39 communicates with a space enclosed by a piston 40, the inner cylinder 35 and a left cap 46 of the latitude cylinder. The path 41 has one end communicating with a space enclosed by the piston 40, the inner cylinder 35 and the locking nut 42. The other end of the path 43 communicates with another inlet/outlet port 44 on an end of the piston rod 6. The shaft 21 includes a signal wheel 34 connected thereto which includes a pair of recesses defined in an outer periphery thereof. The upper casing 33 includes induction magnetic rings 201, 202 which are located corresponding to the recesses.

The cylinder 9 of the latitude cylinder includes induction magnetic rings 47, 48 on an outer periphery thereof and the induction magnetic rings 47, 48 are induced with the piston 8 in the cylinder 9. The longitudinal cylinder 26 has induction magnetic rings 49, 50 on an outer periphery thereof and the induction magnetic rings 49, 50 are induced with a piston 27 in the longitudinal cylinder 26. A cylinder locking unit 51 is connected to a side of the right cap 5 of the cylinder 9 and another cylinder locking unit 52 is connected to a side of the top cap 28 of the longitudinal cylinder 26. The cylinder locking units 51 and 52 are well known to persons in the art. The right cap 5 includes a hole and a pin and a spring are received in the hole. The pin is cooperated with a recess of the piston rod 6 and a washer is mounted to the pin so that when the piston rod 6 is moved to a pre-set position, the pin enters into the recess in the piston rod 6 so as to lock the cylinder.

While we have shown and described the embodiment in accordance with the present invention, it should be clear to those skilled in the art that further embodiments may be made without departing from the scope of the present invention.

What is claimed is:

1. A cutter shifting mechanism for exchanging a cutter between a machine and a cutter storage unit, the cutter shifting mechanism comprising:
    a main body having a longitudinal cylinder main casing and a shaft located in the longitudinal cylinder main casing,
    an arm for engaging the cutter and connected to a lower end of the shaft,
    a longitudinal pushing device connected to a top end of the shaft and a gear rotatably mounted to the shaft and mounted such that the shaft is movable by the longitudinal pushing device along a longitudinal axis of the shaft relative to the gear,
    a threaded rod engaged with the gear and connected with a latitude pushing device,
    each of the longitudinal and latitude pushing devices includes a pneumatic cylinder.

2. The mechanism as claimed in claim 1, wherein the pneumatic cylinder of the longitudinal pushing device includes a bottom cap and a top cap, and a piston rod is received in the pneumatic cylinder of the longitudinal pushing device and extends through the bottom cap and is connected with the top end of the shaft.

3. The mechanism as claimed in claim 1, wherein the latitude pushing device includes a latitude cylinder casing which includes an inner cylinder received therein, the threaded rod is located in the inner cylinder in the latitude cylinder casing and a first piston rod is received in the latitude cylinder casing, a first end of the first piston rod extends through the inner cylinder and an end cap of the latitude cylinder casing, a second end of the first piston rod extends through the inner cylinder and is connected to an end of a second piston rod of a latitude cylinder by a locking nut.

4. The mechanism as claimed in claim 3, wherein the two piston rods are hollow and tubular rods, the first piston rod includes a path in the left part thereof and a path in the right part thereof, the second piston rod includes a path defined therein, the path in the left part of the first piston rod has one end communicating with an inlet/outlet port at the end cap and the other end of the path in the left part of the first piston rod communicates with a space enclosed by a piston, the inner cylinder and a left cap of the inner cylinder, the path in the right part of the first piston rod has one end communicating with a space enclosed by the piston, the inner cylinder and the locking nut, and an end of the path of the second piston rod communicates with another inlet/outlet port on an end of the second piston rod.

5. The mechanism as claimed in claim 1, wherein the longitudinal cylinder main casing is composed of a lower casing and an upper casing which is connected to the lower casing, a slidable lubrication bearing is mounted to the shaft.

6. The mechanism as claimed in claim 1, wherein the gear and the shaft are slidably connected to each other by engaging keys with keyways.

7. The mechanism as claimed in claim 1, wherein the latitude pushing device includes a latitude cylinder casing which includes an inner cylinder received therein, which inner cylinder has a right cap and a left cap connected on two ends of the inner cylinder, and wherein a linear bearing is located in the latitude cylinder casing.

8. The mechanism as claimed in claim 1, wherein the shaft includes a signal wheel connected thereto which includes a pair of recesses defined in an outer periphery thereof, an upper casing of the longitudinal cylinder main casing includes induction magnetic rings which are located corresponding to the recesses.

9. The mechanism as claimed in claim 1, wherein the pneumatic cylinder of the latitude pushing device includes induction magnetic rings on an outer periphery thereof and the induction magnetic rings are induced with a piston in the pneumatic cylinder of the latitude pushing device, the pneumatic cylinder of the longitudinal pushing device has induction magnetic rings on an outer periphery thereof and the induction magnetic rings of the pneumatic cylinder of the longitudinal pushing device are induced with a piston in the pneumatic cylinder in the longitudinal pushing device, and a cylinder locking unit is connected to a side of a right cap of the pneumatic cylinder of the latitude pushing device and another cylinder locking unit is connected to a side of a top cap of the pneumatic cylinder of the longitudinal pushing device.

* * * * *